(12) United States Patent
Branover et al.

(10) Patent No.: US 8,566,628 B2
(45) Date of Patent: Oct. 22, 2013

(54) NORTH-BRIDGE TO SOUTH-BRIDGE PROTOCOL FOR PLACING PROCESSOR IN LOW POWER STATE

(75) Inventors: Alexander Branover, Chestnut Hill, MA (US); Maurice B. Steinman, Marlborough, MA (US); Ming L. So, Danville, CA (US); Xiao Gang Zheng, Sunnyvale, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 1109 days.

(21) Appl. No.: 12/436,439

(22) Filed: May 6, 2009

(65) Prior Publication Data

US 2010/0287394 A1 Nov. 11, 2010

(51) Int. Cl.
*G06F 1/32* (2006.01)

(52) U.S. Cl.
CPC .................................. *G06F 1/3234* (2013.01)
USPC ............ 713/323; 713/310; 713/324; 713/330

(58) Field of Classification Search
USPC ......................................................... 713/320
See application file for complete search history.

(56) References Cited

U.S. PATENT DOCUMENTS

| 5,530,932 | A | | 6/1996 | Carmean et al. | |
|---|---|---|---|---|---|
| 5,541,850 | A | * | 7/1996 | Vander Zanden et al. | .... 716/102 |
| 5,628,020 | A | * | 5/1997 | O'Brien | ......... 713/322 |
| 5,737,615 | A | * | 4/1998 | Tetrick | ........... 713/324 |
| 5,740,417 | A | | 4/1998 | Kennedy et al. | |
| 5,813,022 | A | | 9/1998 | Ramsey et al. | |
| 5,884,088 | A | * | 3/1999 | Kardach et al. | ............... 713/324 |
| 6,125,450 | A | | 9/2000 | Kardach et al. | |
| 6,141,283 | A | * | 10/2000 | Bogin et al. | .................. 365/226 |
| 6,282,662 | B1 | * | 8/2001 | Zeller et al. | .................... 713/300 |
| 6,360,337 | B1 | | 3/2002 | Zak et al. | |
| 6,480,965 | B1 | * | 11/2002 | Harriman et al. | ............. 713/322 |
| 6,496,895 | B1 | * | 12/2002 | Harriman et al. | ............. 710/306 |
| 6,510,525 | B1 | | 1/2003 | Nookala et al. | |
| 6,553,501 | B1 | | 4/2003 | Yokoe | |
| 6,711,691 | B1 | | 3/2004 | Howard et al. | |
| 6,760,852 | B1 | * | 7/2004 | Gulick | ........................ 713/324 |
| 6,954,864 | B2 | | 10/2005 | Schelling | |
| 6,976,181 | B2 | | 12/2005 | Dia et al. | |
| 6,988,214 | B1 | | 1/2006 | Verdun | |

(Continued)

FOREIGN PATENT DOCUMENTS

| EP | 1024432 A1 | 2/2000 |
|---|---|---|
| EP | 1607838 A1 | 12/2005 |
| WO | 2007103051 | 9/2007 |
| WO | 2008007273 A2 | 1/2008 |

OTHER PUBLICATIONS

International Search Report and Written Opinion mailed Feb. 22, 2011 in PCT/US2010/055598, 10 pages.

(Continued)

*Primary Examiner* — Ryan Stiglic
(74) *Attorney, Agent, or Firm* — Abel Law Group, LLP

(57) ABSTRACT

A processor integrated circuit has one or more processor cores and a power management controller in a North-Bridge that generates a first power state recommendation for the one or more processor cores. The North-Bridge also receives a second power state recommendation from a South-Bridge integrated circuit. The North-Bridge determines a final power state for the one or more processor cores based on the first and second power state recommendations.

24 Claims, 3 Drawing Sheets

(56) References Cited

U.S. PATENT DOCUMENTS

| | | | |
|---|---|---|---|
| 7,028,200 B2* | 4/2006 | Ma | 713/324 |
| 7,051,218 B1* | 5/2006 | Gulick et al. | 713/310 |
| 7,146,510 B1* | 12/2006 | Helms et al. | 713/300 |
| 7,152,169 B2 | 12/2006 | Cooper et al. | |
| 7,159,766 B2 | 1/2007 | Wurzburg et al. | |
| 7,162,404 B2* | 1/2007 | Hunt et al. | 703/16 |
| 7,174,467 B1* | 2/2007 | Helms et al. | 713/300 |
| 7,200,544 B1* | 4/2007 | McCown | 703/19 |
| 7,200,762 B2 | 4/2007 | Pearl | |
| 7,231,534 B2* | 6/2007 | Ma | 713/323 |
| 7,299,370 B2* | 11/2007 | George et al. | 713/322 |
| 7,315,952 B2* | 1/2008 | Wilcox et al. | 713/320 |
| 7,444,526 B2* | 10/2008 | Felter et al. | 713/300 |
| 7,454,632 B2* | 11/2008 | Kardach et al. | 713/300 |
| 7,469,349 B2* | 12/2008 | Han et al. | 713/300 |
| 7,472,299 B2* | 12/2008 | Mukherjee | 713/323 |
| 7,475,263 B2* | 1/2009 | Wei et al. | 713/300 |
| 7,523,324 B2* | 4/2009 | Ma | 713/300 |
| 7,613,934 B2 | 11/2009 | Hou et al. | |
| 7,624,286 B2* | 11/2009 | Lin et al. | 713/300 |
| 7,644,293 B2* | 1/2010 | Sistla et al. | 713/323 |
| 7,750,912 B2* | 7/2010 | Polzin et al. | 345/501 |
| 7,788,516 B2* | 8/2010 | Conroy et al. | 713/340 |
| 7,949,887 B2* | 5/2011 | Gunther et al. | 713/320 |
| 7,966,506 B2 | 6/2011 | Bodas et al. | |
| 8,112,651 B2 | 2/2012 | Wang et al. | |
| 8,140,868 B2* | 3/2012 | Felter et al. | 713/300 |
| 8,190,939 B2* | 5/2012 | Fields et al. | 713/324 |
| 8,209,559 B2* | 6/2012 | Memon et al. | 713/320 |
| 2002/0103976 A1 | 8/2002 | Steely et al. | |
| 2003/0204760 A1 | 10/2003 | Youngs | |
| 2003/0229821 A1* | 12/2003 | Ma | 714/8 |
| 2005/0028015 A1 | 2/2005 | Asano et al. | |
| 2005/0039063 A1* | 2/2005 | Hsu et al. | 713/324 |
| 2005/0144487 A1 | 6/2005 | Puffer et al. | |
| 2005/0273633 A1* | 12/2005 | Wilcox et al. | 713/300 |
| 2005/0273635 A1* | 12/2005 | Wilcox et al. | 713/320 |
| 2005/0289369 A1 | 12/2005 | Chung et al. | |
| 2006/0031692 A1 | 2/2006 | Kato et al. | |
| 2006/0047987 A1 | 3/2006 | Prabhakaran et al. | |
| 2006/0053326 A1* | 3/2006 | Naveh et al. | 713/323 |
| 2006/0143409 A1 | 6/2006 | Merrell et al. | |
| 2006/0174142 A1* | 8/2006 | Lin et al. | 713/300 |
| 2006/0174151 A1* | 8/2006 | Lin et al. | 713/500 |
| 2006/0294406 A1 | 12/2006 | Cline | |
| 2007/0011480 A1 | 1/2007 | Banginwar et al. | |
| 2007/0115290 A1* | 5/2007 | Polzin et al. | 345/501 |
| 2007/0143640 A1* | 6/2007 | Simeral et al. | 713/320 |
| 2007/0157042 A1 | 7/2007 | Jahagirdar et al. | |
| 2008/0005596 A1* | 1/2008 | Sistla et al. | 713/300 |
| 2008/0028240 A1 | 1/2008 | Aria et al. | |
| 2008/0077813 A1 | 3/2008 | Keller et al. | |
| 2008/0082769 A1 | 4/2008 | Bouchou et al. | |
| 2008/0141265 A1 | 6/2008 | Choi | |
| 2008/0235364 A1 | 9/2008 | Gorbatov et al. | |
| 2008/0301475 A1* | 12/2008 | Felter et al. | 713/300 |
| 2009/0150696 A1 | 6/2009 | Song et al. | |
| 2009/0164814 A1 | 6/2009 | Axford et al. | |
| 2009/0259862 A1* | 10/2009 | Bulusu et al. | 713/322 |
| 2010/0162014 A1* | 6/2010 | Memon et al. | 713/320 |
| 2010/0185820 A1 | 7/2010 | Hughes et al. | |
| 2010/0185821 A1 | 7/2010 | Paver et al. | |
| 2011/0022857 A1* | 1/2011 | Nussbaum et al. | 713/300 |
| 2011/0112798 A1* | 5/2011 | Branover et al. | 702/186 |
| 2011/0113202 A1* | 5/2011 | Branover et al. | 711/135 |
| 2011/0148887 A1* | 6/2011 | Chong et al. | 345/501 |
| 2011/0264934 A1* | 10/2011 | Branover et al. | 713/320 |
| 2011/0296222 A1* | 12/2011 | Tan et al. | 713/324 |

OTHER PUBLICATIONS

"Optimized Buffer Flush/Fill," PCI-SIG Draft Engineering Change Notice, Intel Corporation, Feb. 27, 2009, 16 pages.

Naveh, Alon, et al., "Power and Thermal Management in the Intel® Core™ Duo Processor," Intel Technology Journal, vol. 10, issue 02, May 15, 2006, pp. 109-122, URL: <http://developer.intel.com/technology/itj/index.htm>.

U.S. Appl. No. 12/702,085, filed Feb. 8, 2010, entitled "Cache Flush Based on Idle Prediction and Probe Activity Level," naming inventors Alexander Branover et al.

U.S. Appl. No. 12/566,930, filed Sep. 25, 2009, entitled "Method and Apparatus for Transitioning Devices Between Power States Based on Activity Request Frequency," naming inventors Alexander Branover et al.

U.S. Appl. No. 12/198,974, filed Aug. 27, 2008, entitled "Hardware Monitoring and Decision Making for Transitioning in and Out of Low-Power State," naming inventors Alexander Branover et al.

International Search Report and Written Opinion mailed Jul. 28, 2010 in App. No. PCT/US2010/033820, 10 pages.

Ballapuram, Chinnakrishnan S. et al., "Exploiting Access Semantics and Program Behavior to Reduce Snoop Power in Chip Multiprocessors," Mar. 2008, ACM, ASPLOS'08, pp. 60-69.

Muchnick, Steven S., "Advanced Compiler Design and Implementation," 1997, Morgan Kaufmann, p. 337.

Turner, Jonathan S., "New Directions in Communications (or Which Way to the Information Age?)," Oct. 1986, IEEE, IEEE Communications Magazine, vol. 24, No. 10, pp. 8-15.

* cited by examiner

NORTH-BRIDGE TO SOUTH-BRIDGE PROTOCOL FOR PLACING PROCESSOR IN LOW POWER STATE

BACKGROUND

1. Field of the Invention

This invention relates to computer systems and more particularly to transitioning computer systems between various power states.

2. Description of the Related Art

Computer systems have various power savings states in order to provide an appropriate balance between power savings and performance. Many computer systems are compliant with the Advanced Configuration and Power Interface (ACPI). The ACPI specification describes processor core power states to be one of C1-Cn. The greater the index n, the deeper the power state and the smaller the consumed power. Conversely, the deeper the power state, the more time (latency) it takes to return to an execution state. Power savings is achieved by reducing the frequency of the clock and/or reducing the voltage. Voltage may be reduced to a retention level where state is preserved in the core or voltage may be reduced beyond the retention level. Obviously, as state is lost, the latency to resume operation is increased. Further, cache may also have its voltage reduced up to and beyond retention levels. The deeper the power state is, the longer the exit latency in order to resume code execution.

In current computer systems, the North-Bridge (also referred to as Uncore in some embodiments) is a central decision node for transitioning the processor and dynamic random access memory (DRAM) into and out of low power states. Uncore refers to those parts of a processor integrated circuit that are not the processor cores and includes such functionality as the memory controller and power management. Normally the transitioning decision is made in the North-Bridge, following the operating system (OS) request for a specific processor C-state. The depth of the power state is decided, based on internal monitors and activity trackers in the North-Bridge. The exit latency from the power state is one of the factors that can have a detrimental effect on incoming transaction streams or interrupts. The power state entered into is a prediction about future activity, and the odds of misprediction are not negligible. The cost of any misprediction is dependent on the application type being executed, and with some workloads, it may lead to such undesirable effects as dropped frames, dropped packets, and/or underscored performance.

The typical way to avoid misprediction effects is to tune monitors and predictors to more conservative values. This in turn reduces opportunities to enter deeper power states and thus leads to higher dynamic and static power consumption. Another way to avoid the effects of misprediction would be to reduce the exit latency from deep C-states. Thus, even misprediction made by the North-Bridge would be promptly corrected by fast transition of the processor into the execution state with no perceivable performance penalty. However, this approach is more costly since it requires more complicated on-die capabilities/arrays or input/output (I/O) interfaces, therefore impacting performance/cost/watt.

SUMMARY

Accordingly, it would be desirable to provide improved prediction capability with respect to power states. Thus, an embodiment of the invention allows the South-Bridge, presiding over the I/O domain, to participate in the power state transition decisions. The South-Bridge, who has better knowledge of I/O activity, notifies the North-Bridge of its power state predictions. Using both North-Bridge and South-Bridge views of the system to make power state transition decisions improves prediction accuracy, thus providing for increased power savings and decreased chances of misprediction and the problems associated with misprediction.

In an embodiment, a method is provided in a computer system that includes generating, based on information available to a first integrated circuit having one or more processor cores, a first power state recommendation. The first integrated circuit receives a second power state recommendation from a second integrated circuit that is coupled to the first integrated circuit. The first integrated circuit determines a final power state for the one or more processor cores based on the first power state recommendation and the second power state recommendation. The second integrated circuit may provide an input/output hub function in the computer system.

In another aspect, a method is provided that includes sending a power transition message from an integrated circuit to input/output devices, the power transition message indicating an intention to transition a processor subsystem into a lower power state. The integrated circuit receives from each of the input/output devices responding to the power transition message one of an acknowledge and a negative acknowledge, the acknowledge indicating that an I/O device can tolerate transitioning to the lower power state and the negative acknowledge indicating that the I/O device cannot tolerate transitioning into the lower power state.

In still another aspect, a method is provided in which a processor integrated circuit, responsive to a first message from an input/output hub integrated circuit, disables entering one or more power saving states until a second message enabling entering the one or more power states is received.

In still another aspect, an apparatus is provided that includes a power management controller on a first integrated circuit that has at least one processor core. The power management controller responds to a request to place the at least one processor core into a power savings state to determine a first recommended deepest power state into which the at least one processor core may be transitioned. The power management controller is further responsive to the request to determine a final power state based on the first recommended power state and a power state recommendation in a recommended power state message received from a second integrated circuit.

In still another aspect, an input/output hub integrated circuit is provided that includes a power management controller configured to generate a power state recommendation that includes at least one recommended power state. A communication interface coupled to the power state controller and the input/output hub integrated circuit sends a message to a processor integrated circuit via the communication interface, the message including the at least one recommended power state.

In still another aspect, an input/output device is provided that responds to a power transition message indicating an intention to transition a processor subsystem to a lower power state, with one of an acknowledge (ACK) and a negative acknowledge (NACK), the ACK indicating that an I/O device can tolerate transitioning to the lower power state and a NACK indicating that the I/O device cannot tolerate transitioning into the lower power state.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
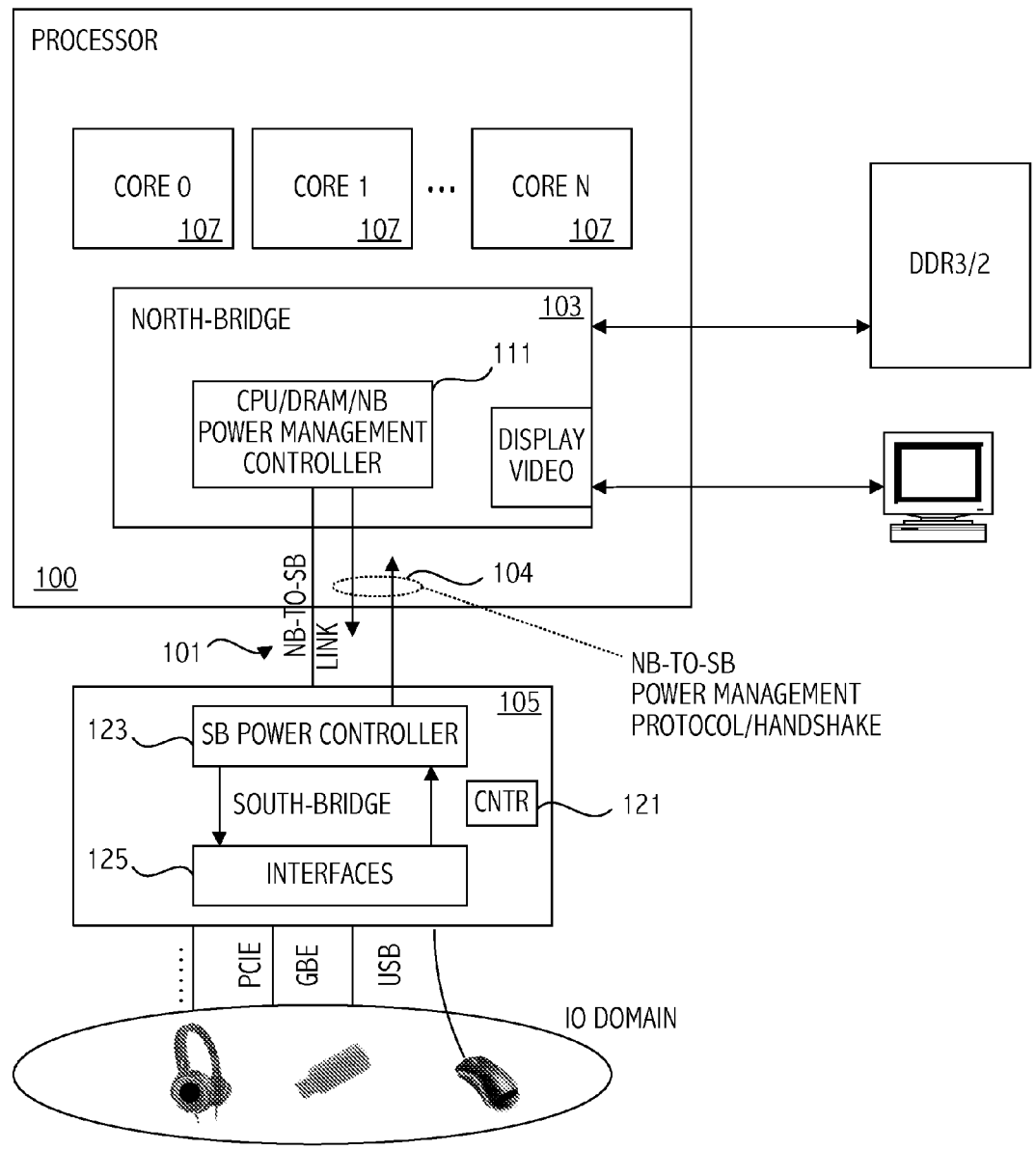
FIG. 1 illustrates a high level block diagram of a computer system according to an embodiment of the present invention.

Referring to FIG. 1, a high level conceptual block diagram of a computer system according to an embodiment of the present invention is illustrated. In the illustrated embodiment, North-Bridge-to-South-Bridge power management protocol is implemented and maintained over a North-Bridge-to-South-Bridge link 101 coupling the North-Bridge (NB) 103 and the South-Bridge (SB) 105. The North-Bridge-to-South-Bridge link 101 provides a dynamic protocol between the North-Bridge and South-Bridge allowing the South-Bridge to participate in the power state transition decisions. The South-Bridge 105 (also referred to as an I/O Controller Hub) represents the input/output (I/O) domain, "presiding" over I/O devices and main I/O controllers. The North-Bridge activity monitors and activity predictors have only partial knowledge about incoming streams, and therefore the possibility of misprediction is not negligible. The South-Bridge is in a better position than the North-Bridge for making an accurate prediction of incoming activity and notifying the North-Bridge of opportunities to transition into a low power state at any point of the flow. Timely notifications allow for increasing power savings and performance/watt of the entire system. The North-Bridge to South-Bridge protocol 104 is based on messages transmitted between the North-Bridge and the South-Bridge over the internal link 101. That link may utilize, e.g., a Hypertransport™ (HT) link or PCIe™ link that couples the North-Bridge 103 and South-Bridge 105. In another embodiment, this protocol may be implemented using out-of-band signals. The dynamic nature of this protocol allows for tracking any change in the system configuration and timely notification of this change to allow for more accurate predictions of activity and interrupts. Messages may be transmitted from the South-Bridge to the North-Bridge in response to a North-Bridge request or when the South-Bridge deems such a notification necessary.

In an embodiment, the North-Bridge identifies a request to place one or a number of the microprocessor cores 107 in a low power state. That request may be either operating system (OS) that is software originated (as it usually happens in most of the microprocessor systems) or it may be a hardware (North-Bridge) originated action triggered by a period of idleness. The request for a low power state basically means that cores are idle (and a software stream is not being executed). The North-Bridge incorporates its own power management controller 111 that determines the deepest power state into which the cores may be transitioned. Exit latency from a low power state is one of the main reasons for performance losses for applications bounded to both CPU and I/O domains. Thus, having knowledge of streams in its domain, the North-Bridge figures out the deepest (i.e., the lowest) power state that the cores may be transitioned into so that exit latency out of this state will not jeopardize applications anticipated to execute on exit out of this state. That deepest state reflects the North-Bridge vision/predictions of the trends in system processes, which is mostly bounded to CPU and Memory subsystems. Yet the North-Bridge has but only partial "knowledge" about the I/O subsystem. The North-Bridge knowledge about how the I/O domain is tolerant to unavailability of CPU or dynamic random access memory (DRAM) (due to longer exit latency) for an upcoming stream is based on tracking of present-time I/O activities and DMA(s).

The South-Bridge presides over the I/O domain and has better control and tracking over I/O activities. Therefore, the South-Bridge is typically more accurate in its prediction of how the I/O subsystem is tolerant to a particular processor power state. In order to take advantage of the South-Bridge knowledge of the I/O subsystem in the power state determination, the solution is a North-Bridge/South-Bridge communication, which may be implemented as a handshake in order to determine a deepest power state that may be acceptable to upcoming applications bounded to both processor and I/O domains.

The processor core power state is designated as one of core power states C1-Cn. The greater the index is, the deeper the power state. While some embodiments have six or fewer states, the protocol described herein is not restricted to any particular number of power states and there are no restrictions on adding new power states. Assume that the North-Bridge decision, based on its view of the system, is that the deepest power state that cores may be transitioned to is Ci. In an embodiment, the North-Bridge notifies the South-Bridge about its intention to transition cores in a low power state and receives a South-Bridge recommendation reflecting the South-Bridge "view of the system" about the deepest power state into which the cores can settle. Assume that the South-Bridge recommendation is core power state Cj. The North-Bridge determines the final power state into which the cores are transitioned as final Power State=MIN {North-Bridge Recommended Power State, South-Bridge Recommended Power State}=MIN {Ci, Cj}, where the MIN function means the least low power state.

Figure 2:
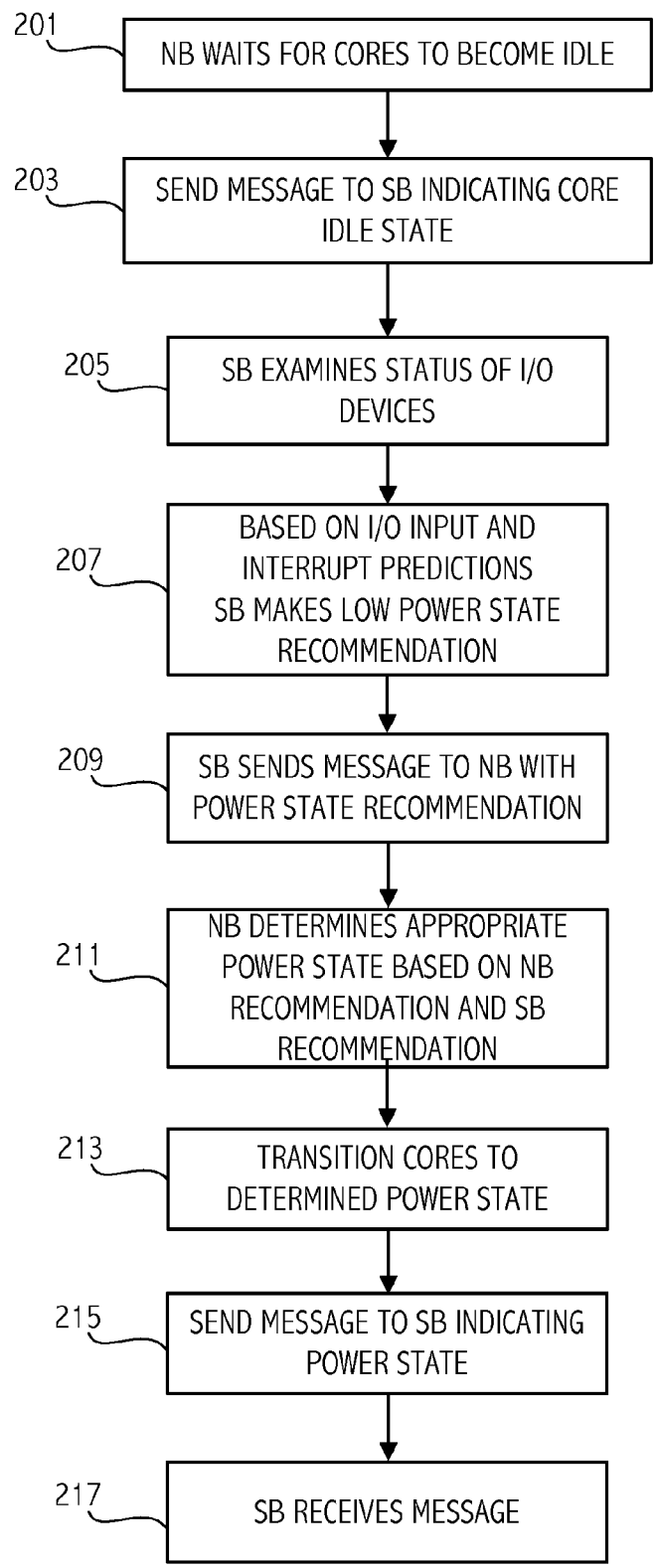
FIG. 2 illustrates a high level flow diagram of an embodiment of the low power state protocol between the North-Bridge and the South-Bridge.

In an embodiment, the North-Bridge-to-South-Bridge protocol is based on a low power state protocol, an embodiment of which is illustrated in the solicited message sequence shown in FIG. 2. As described further, the protocol herein may include messages from the South-Bridge solicited by the North-Bridge, or the South-Bridge may provide unsolicited messages providing power state recommendations.

In 201, the North-Bridge waits for the cores to become idle (enter Power State C1). Once all cores become idle, the North-Bridge sends the message in 203 to the South-Bridge with exemplary semantics: <ALL Cores>:<State=C1>, where C1 means IDLE but cores have not been transitioned into a low power state yet; that is, the clock has not been gated off and voltage has not yet been reduced.

In 205, in response to receiving the message from the North-Bridge, the South-Bridge examines the status of the I/O devices (e.g., a universal serial bus (USB) controller, an HD audio functionality (supplying high definition audio), a Gigabit Ethernet Controller, etc.) focusing on two traffic streams—coherent activity and interrupt messages. The coherent activity is typically related to data from the I/O devices that may be queued up in I/O devices on receipt and prior to being sent to coherent memory. Alternatively, the I/O devices may be supplying/receiving isochronous data for a latency-sensitive application and this requires completing data movement within a bounded latency period so as not to adversely affect the application. In some embodiments, the South-Bridge sends messages to I/O devices indicating the intention to transition the processor sub-system into a lower power state. At least some of the I/O devices may be Endpoints, which are I/O devices compliant with the PCIe protocol. The message to I/O devices may include the proposed lower power state or some other indication to allow the I/O devices to evaluate the proposed power state. I/O devices may positively or negatively acknowledge this South-Bridge message. In other embodiments, the South-Bridge sends messages to I/O devices indicating a worst case exit latency and I/O devices send their acknowledge (ACK) or negative acknowledge (NACK) based on how tolerant to exit latency the buffering/processes are of the particular I/O device. The worst case exit latency corresponds to a particular power state.

Figure 3:
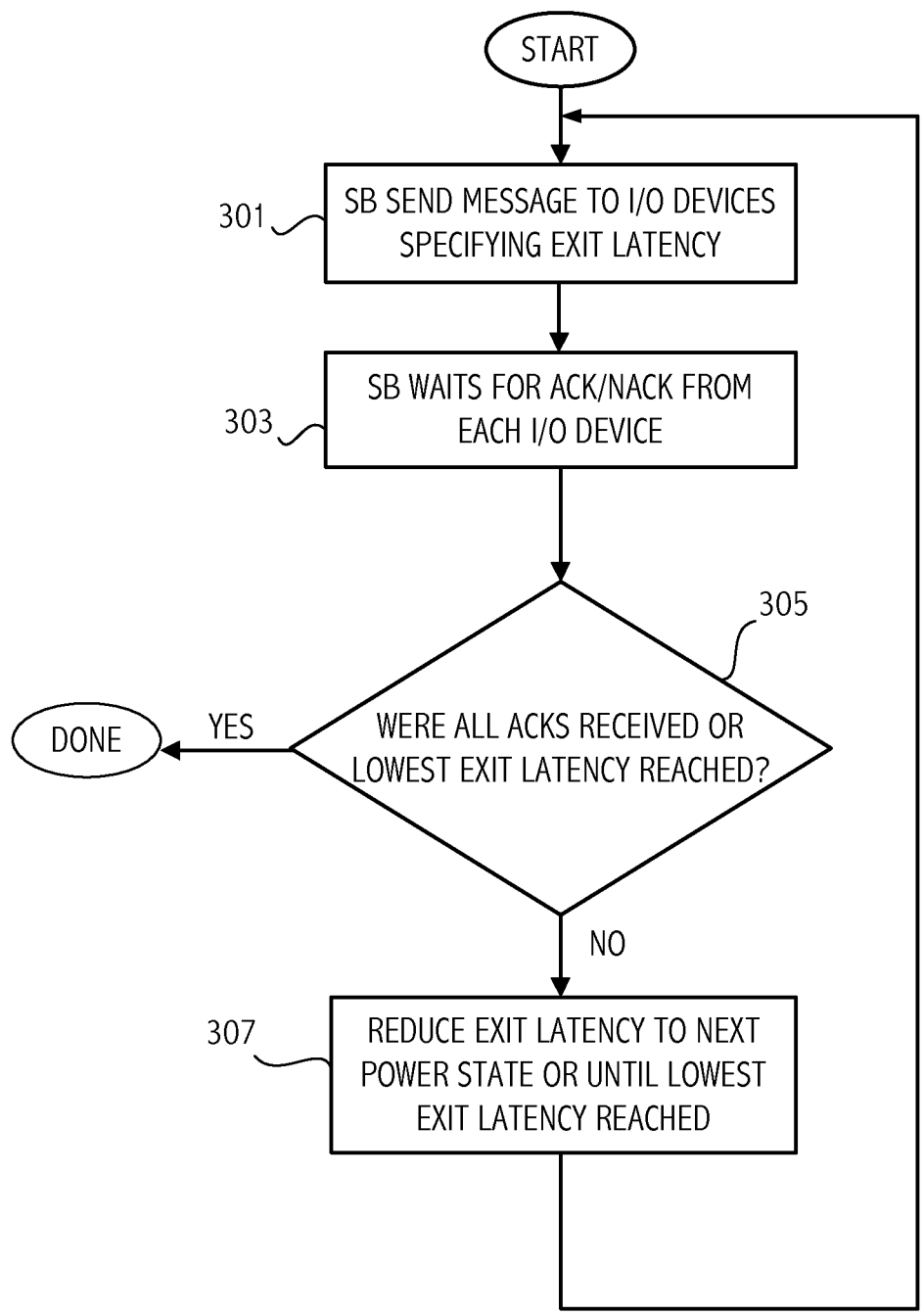
FIG. 3 illustrates a high level flow diagram of an embodiment of the South-Bridge determining a power state suitable for the I/O portion of the system.

In an embodiment, the South-Bridge determines the power state suitable for all the input/output devices as shown in FIG. 3. FIG. 3 represents functionality incorporated into the South-Bridge power management controller 123, which utilizes interfaces 125 to communicate with the various I/O devices. In 301, the South-Bridge sends a message to the input/output devices specifying an exit latency starting with the longest exit latency (the first exit latency sent corresponding to the deepest power state). In 303, the South-Bridge waits for ACKs/NACKs from the I/O devices or input/output devices. In 305, if all ACKs are received, the process ends and the suitable exit latency is determined and can be returned to the North-Bridge. If in 305, one or more NACKs are received, the South-Bridge reduces the exit latency in 307 to the next longest exit latency and returns to 301 to send another message to the I/O devices with the next longest exit latency. This process repeats until all the I/O devices agree on an exit latency (all ACKs received) or no more exit latencies are available for consideration. Once this process is completed, the South-Bridge knows the deepest power state that the current I/O configuration can tolerate. In other embodiments, the proposed power state is sent starting with the deepest power state and continuing with shallower power states until all ACKs are received or I/O power savings state can be agreed upon.

In other embodiments, the I/O devices are the originators of latency updates rather than being responsive to a South-Bridge request. The I/O devices update their latency tolerance by sending a message to the South-Bridge either when their circumstances change or on a periodic basis. In that way, when the South-Bridge receives a North-Bridge request for the South-Bridge power state recommendation, the South-Bridge already knows the longest latency (and deepest power state) that the I/O domain can tolerate. This frees the South-Bridge from the need to make inquiries to the devices in the I/O domain. The I/O devices can determine their tolerance based, e.g., on how fast their queues are filling or emptying, thus indicating a possible overflow or underflow or need for access to/from coherent memory.

In addition to determining the tolerance of I/O devices to various latencies through the messaging described above, the South-Bridge can make predictions about incoming interrupts. For example, if memory has not been allocated to a gigabit Ethernet device, then it will likely be necessary to wake up the OS to complete memory allocation for the device. Wake-up is an interrupt event and a low power state is not recommended in such circumstances.

Another source of South-Bridge prediction is timer-tick events that are used with some operating systems to periodically wake up the system in order to check the readiness of new tasks for execution. Due to strict periodicity of this wake-up event and due to the fact that timer-tick counters 121 (see FIG. 1) are part of the South-Bridge in some embodiments, the South-Bridge can easily and accurately predict the time remaining until the next wake-up event in such embodiments. Threshold levels of the remaining time may be utilized to determine the appropriate low power state. A simple approach may be used to translate the remaining time into a recommended power state in which the time left to the next timer-tick wake-up is compared to successively shorter thresholds corresponding to successively shallower power states until a power state is found or the lowest threshold is reached and no suitable power state is found that corresponds to the remaining time left. The approach is shown below:

---

If (Time Left to the next Timer-Tick Wake-Up> Threshold 1) Power State = Ck (deepest one)
Else If (Time Left to the next Timer-Tick Wake-Up> Threshold 2) Power State = CkI (shallower than Ck)
Else If (Time Left to the next Timer-Tick Wake-Up> Threshold 3) Power State = Ck-I2(shallower than CkI)
...
Else Power State = No Transition

---

Thus, referring back to FIG. 2, based on responses to South-Bridge inquiries to the I/O devices (or unsolicited inputs as to exit latency tolerances or power state tolerances from the I/O devices) and based on its other sources (e.g., timer-tick counter), the South-Bridge determines in 207 the deepest power state for cores that will satisfy the current I/O system configuration for both coherent streams and interrupts.

The South-Bridge collects inputs and sends message in 209 indicating the deepest power state possible from the I/O perspective. In an embodiment, the message has the following semantics:
<All Cores>:<Deepest State with Cache On><Deepest State with Cache Off>.

The reason for differentiating Cache On and Cache Off states in certain of the embodiments relates to specifics of the core power states. The power state with Cache On means that retention voltage is applied so that cache content is unaffected. Any cache-coherent traffic sent by I/O devices requires exiting this state in order to service the coherent transaction traffic. Servicing the traffic is required because the cache needs to be probed in case it contains dirty data. Exit latency is low as it only requires elevating the voltage to the minimally required functional level and servicing the request.

Coherent requests, however, do not cause the cores to exit power states with Cache Off. Instead, an interrupt is typically used to wake the cores out of power states with Cache Off. From the processor standpoint, the state with Cache Off (cache written-back into memory and invalidated) is deeper than the state with Cache On. However, from the South-Bridge standpoint, which really represents I/O standpoint, it may be easier to agree with the North-Bridge to a power state with Cache Off than with Cache On. For example, in an I/O configuration with actively snooping devices (USB, HD Audio, etc.) a power state with Cache On can be achieved on a less frequent basis and the power state that can be achieved changes all the time—dependent on the amount of time remaining before the start of the next coherent transaction. Thus, it can be advantageous for the South-Bridge to tell the North-Bridge how deep it can place cores for each of two cases—with Cache On and with Cache Off.

In an embodiment, <Deepest State with Cache On> is a two bit field indicating whether retention voltage can or cannot be applied to the cores with cache ON. The two bit field allows states C0-C3 to be specified. In such an embodiment, C0 represents the active state, and the lower power states C1-C3 represent various levels of power savings based on frequency reduction and/or voltage reduction in which state is maintained and therefore latency to resume the active state is relatively short. The particular levels of power savings may be dependent on the particular system. In an embodiment, the C3 state is a state in which the clocks are stopped and the voltage is reduced to a retention level to maintain state and represents the deepest power state achievable with Cache On. In other embodiments, fewer or additional bits may be utilized. The South-Bridge may keep sending updates for this field in response to status changing. For example, a few microseconds before the start of a coherent transaction, the South-Bridge sends <Deepest State with Cache On>=0. After the coherent transaction is over and given that there is a sufficient time before the next coherent transaction, the South-Bridge sends update <Deepest State with Cache On>=1 (or 2 or 3).

<Deepest State with Cache Off> is an N-bit encoding (2 bits in one specific embodiment) indicating the depth of the power state when cache state is not retained in the processor. In an embodiment, the two bits can be used to specify C0, and C4-C6. The C4-C6 states represent progressively deeper power states in which the cache state is not maintained. In some embodiments, it may be possible to separately control maintaining the cache state and the rest of the processor state. The South-Bridge can also change <Deepest State with Cache Off> status over a period of the cores idleness in order to reflect a new I/O configuration status. A new I/O configuration status may arise, e.g., when a new device is plugged in and plug-in interrupt is on the way. In another example, a wake up event may be indicated when a direct memory access (DMA) operation is in progress transferring data to/from an I/O device and the South-Bridge predicts that the DMA will end with End-Of-DMA that will wake-up the cores. One of the modes that I/O devices can follow is a producer-consumer mode where the I/O device generates a coherent direct memory access (DMA) stream accessing some memory area, and then notifies the processor that the data may be consumed by the processor by sending an interrupt. Additionally, the I/O may be a consumer and the cores/application may be a producer. For example, a video stream reads data from the memory. When the I/O device has consumed all the data, it sends an interrupt to the cores/application to allocate more memory for frames.

Note that all possible combinations of <Deepest State with Cache On> and <Deepest State with Cache Off> can be meaningful. For example, for the South-Bridge message, <All Cores>:<1><6>, both retention state with Cache On and the deepest C6 state can be reached. The South-Bridge does not expect coherent or interrupt activity within the time interval that will compromise the value of transition into the C6 state.

A South-Bridge message <All Cores>:<0><6> indicates the system is in the middle of coherent activity or coherent activity is incoming, so a retention state is not recommended. C6 may be reached since interrupts are not expected.

A South-Bridge message <All Cores>:<1><0> indicates that a retention state is achievable due to the low exit latency from the retention state. A deeper state with Cache Off is not reachable since a longer exit latency (of a deeper power state) will not be tolerated by upcoming I/O activities.

A South-Bridge message <All Cores>:<0><0> indicates that no low power state can be reached with Cache On or Cache Off. The system is in the middle of both coherent and interrupt activity, so a low power state cannot be tolerated. From the South-Bridge perspective, cores should be kept in a power state that does not compromise exit latency, e.g., C0.

A South-Bridge message <All Cores>:<3><0> indicates that a low power state (C3) can be reached with Cache On but not with Cache Off. The system is in the middle of interrupt activity but coherent activity is such as to tolerate the low latency period of C3.

In the cases illustrated above, the North-Bridge has to combine its determination of the appropriate power savings state from the North-Bridge perspective, with the South-Bridge perspective contained in the South-Bridge message specifying the Cache On and Cache Off power states as described below.

Referring again to FIG. 2, at 211, the North-Bridge receives the message sent by the South-Bridge and determines the appropriate power state between the one that North-Bridge has determined as appropriate and the power state specified in the South-Bridge message. In an embodiment where Cache On and Cache Off power state recommendations are provided by the South-Bridge, the North-Bridge applies MAX { min {NB Cstate, SB Cache ON state}, min {NB Cstate, SB Cache Off state} } to determine the appropriate power state, where min represents the deepest power state and MAX is the shallowest power state. In so doing, the North-Bridge determines whether to utilize the Cache On South-Bridge power state recommendation or the Cache Off South-Bridge power state recommendation or its own. In an embodiment, if the South-Bridge recommends a Cache On state, i.e., the 2 bit Cache Off recommendation specifies the C0 state, indicating interrupt activity, the North-Bridge selects the power state recommended by either the South-Bridge Cache On or the North-Bridge. The low latency associated with any of the Cache On states is assumed to be satisfactory for the interrupt activity. Thus, for example, assume the South-Bridge message is <All Cores>:<2><0>, and assume the North-Bridge recommendation is C3 (NB Cstate=3). The North-Bridge applies MAX { min {3, 2}, min {3, 0}}=MAX {2,0}=2 and obtains the C2 state as the final power state. That approach may place more importance on the deeper power states obtainable based on interrupts over coherent access.

In other embodiments, the South-Bridge may send only a single recommended power state. For example, if the South-Bridge determines a recommended power state of Cache On=2, Cache Off=6, the South-Bridge can combine those recommendations into a single C6 recommendation. If the South-Bridge determines a recommended power state Cache On=2, Cache Off=0, the South-Bridge can combine those recommendations into a single C2 recommendation. Thus, the South-Bridge message is <All Cores>:<SB C-State> and the North-Bridge determines the final power state as min {NB Cstate, SB C-state}. In still other embodiments, the South-Bridge may send additional power state recommendations based on specific aspects of the particular system. For example, in a system where interrupt and coherent activity were equally important, the South-Bridge may simply send as the deepest state the shallowest state required by the I/O system.

At 213, the North-Bridge transitions the cores into the power state determined in accordance with the North-Bridge determination and the South-Bridge message, and in 215 sends a message to the South-Bridge indicating the specific power state into which the cores have been transitioned. In an embodiment, the message semantics are <cores>:<Power State>, where Power State is N-bit encoding (3-bit in one specific embodiment).

At 217, the South-Bridge receives the North-Bridge message and may use it for its internal decisions. In one embodiment, it may request I/O devices to transition into power-saving mode, withholding its requests to processor/memory domain. In other embodiments, the South-Bridge can throttle and/or buffer non-urgent requests or interrupts by itself, increasing cores residency in a low power state. Further, in some embodiments, the South-Bridge can decide to keep memory in a low power (self-refresh) state waiting for an interrupt to be delivered. The rationale is that since all cores are in a low power state, neither the operating system nor software applications can read the memory in the low power state, and therefore there is no need to keep memory in other than a low power state until application software and/or the operating system can access memory. That also means that South-Bridge accesses are held off. There is a power savings gain to this approach in that the DRAM and processor to South-Bridge link may be in a lower power state for a longer time and be woken up only when needed.

As it has been mentioned, the I/O configuration status is not static. It may change over time during the same tenure of cores idleness. In an embodiment, the South-Bridge reflects updated I/O status if necessary by sending additional messages such as <cores>:<Deepest State with Cache On><Deepest State with Cache Off>, or other appropriate single power state recommendation as described herein, reflecting the new I/O status. Exemplary events that trigger the South-Bridge to send an update message include an approaching start of a coherent transaction, a plug/unplug event of an I/O device, a watermark crossing of transaction buffers in I/O devices, overflow events in I/O devices, approaching end-of-DMA interrupt, proximity to the timer-tick interrupt, etc. In an embodiment, the South-Bridge sends a message such as <cores>:<0><0>, forcing the cores to transition out of their low power state, but keeping the cores idle (that is, software execution is not resumed) in response to an I/O trigger event to prepare the cores to handle the impending activity.

While certain embodiments of the invention describe the coordination for figuring the power state of the cores, other embodiments may include the memory power state in the negotiation process. Exemplary message semantics for such embodiments are, <cores><memory>:<Deepest Core State with Cache On><Deepest Core State with Cache Off><Memory State>, or alternatively, where only a single core power state is sent by the South-Bridge: <cores><memory>:<Deepest Core State><Memory State>.

The memory power state reflects the memory speed/bandwidth. The North-Bridge controls CPU and/or GPU (graphic processor unit) executed applications, or at least has visibility into what is being executed, and may decide, based on that knowledge, to lower memory speed (thus lowering bandwidth). This power action with respect to memory can be based on South-Bridge power state recommendations that include memory in order to take advantage of the South-Bridge prediction of the bandwidth requirement of I/O originated DMA activities.

In various embodiments described above, the North-Bridge to South-Bridge handshake for power states was solicited by a North-Bridge message to the South-Bridge indicating that a South-Bridge power state recommendation was desired. In other embodiments, the North-Bridge-to-South-Bridge handshake may be replaced with South-Bridge proactive or unsolicited notifications about the deepest low power state into which cores and/or memory may be transitioned. In such an embodiment, the South-Bridge sends a message "<cores><memory>:<Deepest Core State with Cache On><Deepest Core State with Cache Off><Memory State>" as a result of any change/trigger in I/O configuration. An unsolicited protocol may have the advantage of being simpler, but may also result in higher power consumption. Rather than being triggered to send an update when it is needed (when requested by the North-Bridge), the South-Bridge sends updates when cores are either in a C0 or a non-C0 state. That can increase the amount of North-Bridge-to-South-Bridge traffic, which can reduce link idleness making link power management less effective. Of course, if the South-Bridge is notified of all power state changes, the South-Bridge can change its behavior accordingly, and notify the North-Bridge only when the cores and/or memory are in certain power states. Circumstances where there is a continuing change of I/O state due to snooping activity coming from snooping I/O devices, may lead to flooding the link with frequent status updates that may have a performance impact by stalling other traffic. But in systems where the link has sufficient bandwidth and link power management is less important, the unsolicited South-Bridge-originated messaging is a viable approach.

One protocol related to power states that has been described is the low power state protocol in which the South-Bridge sends a message to the North-Bridge with a South-Bridge power state recommendation that may include a Cache On and Cache Off recommended power state. A second related capability that may be utilized with the low power state protocol or separately, is virtual disabling of low power states, e.g., non-C0 states. In other embodiments, the virtual disabling of low power states may allow entering certain low power states as long as state is maintained in the processor, thereby ensuring a short latency. In still other embodiments, the virtual disabling of low power states may allow reduced clock frequency and voltage as long as the cores remain operational.

Virtual disabling of low power states is controlled by a South-Bridge originated unilateral message having an exemplary format, <All Cores>:<exit Low power state>. In an embodiment, the message does not require a North-Bridge acknowledgment or response. One aspect of this message is that it functions as a virtual wire having effect outside the period of the current power state of the cores. That is, the South-Bridge can decide, based on the current state of the I/O configuration, to disable transitions into a low power state by asserting the virtual wire (by sending the message). Low power states will be disabled until a new message from the South-Bridge comes in specifying that low power states are permitted. That may be accomplished by having a one bit field in the message where a "1" indicates to disable low power states and a "0" enables low power states. If the cores are already in a low power state that is disabled when the South-Bridge message arrives disabling low power states, the cores immediately exit any disabled low power state and transition into a ready-for-instructions execution state or other enabled power state.

As stated above, the low power states that are disabled by the virtual disabling message may vary according to system needs. In some systems the definition of which low power states are disabled (or which power states are allowed) when low power states are virtually disabled is programmable. In such a programmable embodiment, the default allowed state may be, e.g., C0, but may be programmable to include C0-C2, with the remaining C-states disabled.

Aspects of the embodiments herein may be partially implemented in software stored in volatile or non-volatile memory in the computer system shown in FIG. 1. Software may be stored in non-volatile portions of a computer system, loaded into volatile memory and executed. Thus, embodiments of the present invention may include features or processes embodied within machine-executable instructions provided by a machine-readable medium such as nonvolatile memory. Such a medium may include any mechanism which stores data in a form accessible by a machine, such as a microprocessor or, more generally, a computer system. A machine readable medium may include volatile and/or non-volatile memory, such as read only memory (ROM); random access memory (RAM); magnetic disk storage media; optical storage media; flash memory devices; tape, or other magnetic, optical or electronic storage medium. Such stored instructions can be used to cause a general or special purpose processor, programmed with the instructions, to perform processes of the present invention.

Note that some of the processes of the present invention may include hardware operating in response to programmed instructions. Alternatively, processes of the present invention may be performed by specific hardware components containing hard-wired logic such as state machines to perform operations or by any combination of programmed data processing components and hardware components. Thus, embodiments of the present invention may include software, data processing hardware, data processing system-implemented methods, and various processing operations, as described herein.

Thus, various embodiments have been described. Note that the description of the invention set forth herein is illustrative, and is not intended to limit the scope of the invention as set forth in the following claims. Variations and modifications of the embodiments disclosed herein may be made based on the description set forth herein, without departing from the scope of the invention as set forth in the following claims.

What is claimed is:

1. A method in a computer system comprising:
generating, based on information available to a first integrated circuit having one or more processor cores, a first power state recommendation;
receiving in the first integrated circuit a second power state recommendation from a second integrated circuit that is coupled to the first integrated circuit, the second power state recommendation including a first recommended power state for processor cache being on and a second recommended power state for the processor cache being off; and
determining a final power state for the one or more processor cores based on the first power state recommendation and the second power state recommendation.

2. The method as recited in claim 1 further comprising the first integrated circuit identifying a request to place the one or more processor cores into a low power state and sending a message to the second integrated circuit requesting the second power state recommendation responsive to the request.

3. The method as recited in claim 1 further comprising the second integrated circuit sending a message to the first integrated circuit that specifies the second power state recommendation.

4. The method as recited in claim 3 further comprising the second integrated circuit making a prediction about one or more incoming interrupts in formulating the second power state recommendation.

5. The method as recited in claim 3 wherein the message to the first integrated circuit that specifies the second power state recommendation is one of an unsolicited message to the first integrated circuit, and a solicited message to the first integrated circuit responsive to a request from the first integrated circuit that the second integrated circuit send the second power state recommendation.

6. The method as recited in claim 3 further comprising the second integrated circuit sending an updated power state recommendation responsive to a change in status visible to the second integrated circuit.

7. The method as recited in claim 6 wherein the change in status is at least one of an approaching start of a coherent transaction, a plug/unplug event, a watermark crossing of transaction buffers in input/output (I/O) devices, an overflow event in I/O devices, approaching end-of-DMA interrupt, and a proximity to a timer-tick interrupt.

8. The method as recited in claim 7 further comprising the first integrated circuit, responsive to the updated power state recommendation from the second integrated circuit, transitioning out of a current lower power state.

9. The method as recited in claim 3 wherein the second power state recommendation includes a recommended memory power state.

10. The method as recited in claim 9 wherein the recommended memory power state includes at least one of memory speed and memory bandwidth.

11. The method as recited in claim 1 further comprising:
sending a power transition message from the second integrated circuit to input/output devices, the power transition message indicating an intention to transition a processor subsystem into a lower power state; and
receiving at the second integrated circuit from each of the input/output devices responding to the power transition message one of an acknowledge (ACK) and a negative acknowledge (NACK), the acknowledge indicating that an I/O device can tolerate transitioning to the lower power state and a NACK indicating that the I/O device cannot tolerate transitioning into the lower power state.

12. The method as recited in claim 11 further comprising the second integrated circuit sending to the input/output devices as part of the power transition message an indication of worst case exit latency for a particular power state and receiving from the input/output devices the acknowledge or the negative acknowledge according to how tolerant respective input/output devices are to the worst case exit latency.

13. The method as recited in claim 12 further comprising the second integrated circuit sending exit latencies to the input/output devices starting with a longest latency corresponding to a deepest power state, and continuing with successively shorter latencies corresponding to successively shallower power states, until positive acknowledgments are received from all the input/output devices for one of the exit latencies or a shortest latency is sent and positive acknowledgments are not received from all the input/output devices for the shortest latency.

14. The method as recited in claim 1 further comprising the second integrated circuit sending a message to the first integrated circuit that specifies the second power state recommendation.

15. An apparatus comprising:
a power management controller on a first integrated circuit including at least one processor core, the power management controller responsive to a request to place the at least one processor core into a power savings state, to determine a first recommended power state into which the at least one processor core may be transitioned; and
wherein the power management controller is further responsive to the request to determine a final power state based on the first recommended power state and on a second recommended power state received in a recommended power state message from a second integrated circuit;

wherein the second recommended power state includes a first power state recommendation for processor cache being on and a second power state recommendation for the processor cache being off.

16. The apparatus as recited in claim 15 wherein the power management controller is operable to send a message to the second integrated circuit, in response to receiving the request, requesting that the second integrated circuit send the second recommended power state recommendation.

17. The apparatus as recited in claim 15 wherein the request is one of a software originated request and a hardware originated request.

18. The apparatus as recited in claim 15 wherein the second recommended power state further includes a memory power state recommendation.

19. An input/output hub integrated circuit comprising:
  a power management controller configured to generate a power state recommendation including at least one recommended power state; and
  a communication interface coupled to the power management controller;
  wherein the input/output hub integrated circuit is configured to send a message to a processor integrated circuit via the communication interface, the message including the power state recommendation, wherein the power state recommendation includes a first recommended power state for processor cache being on and a second recommended power state for the processor cache being off.

20. The input/output hub integrated circuit as recited in claim 19 further configured to send the message responsive to a message received from the processor integrated circuit, requesting that the input/output hub integrated circuit send the power state recommendation.

21. The input/output hub integrated circuit as recited in claim 19 further configured to send the message unsolicited.

22. The input/output hub integrated circuit as recited in claim 19 wherein the power management controller is configured to generate a prediction of one or more incoming interrupts in formulating the power state recommendation.

23. The input/output hub integrated circuit as recited in claim 22 further comprising a timer circuit and wherein the power management controller is configured to base the prediction about the one or more interrupts at least in part on time remaining until a periodic wake-up event occurs according to the timer circuit.

24. The input/output hub integrated circuit as recited in claim 19 wherein the power management controller is configured to generate as part of the power state recommendation a recommended memory power state.

* * * * *